United States Patent
Katsura et al.

(10) Patent No.: US 12,005,947 B2
(45) Date of Patent: Jun. 11, 2024

(54) DRIVE UNIT

(71) Applicant: EXEDY Corporation, Neyagawa (JP)

(72) Inventors: Hitoshi Katsura, Neyagawa (JP); Taichi Kitamura, Neyagawa (JP); Chika Baba, Neyagawa (JP)

(73) Assignee: EXEDY Corporation, Osaka (JP)

( * ) Notice: Subject to any disclaimer, the term of this patent is extended or adjusted under 35 U.S.C. 154(b) by 791 days.

(21) Appl. No.: 17/117,456

(22) Filed: Dec. 10, 2020

(65) Prior Publication Data
US 2021/0213993 A1 Jul. 15, 2021

(30) Foreign Application Priority Data

Jan. 10, 2020 (JP) .................................. 2020-002867

(51) Int. Cl.
*B62B 5/00* (2006.01)
*B62B 3/06* (2006.01)
*B62D 51/04* (2006.01)

(52) U.S. Cl.
CPC .......... *B62B 5/0046* (2013.01); *B62B 3/0612* (2013.01); *B62D 51/04* (2013.01)

(58) Field of Classification Search
CPC .. B62B 3/00; B62B 3/001; B62B 3/02; B62B 3/06; B62B 3/0606; B62B 3/0612; B62B 3/0618; B62B 5/00; B62B 5/0026; B62B 5/0046; B62B 5/005; B62B 5/0035; B62D 51/04
See application file for complete search history.

(56) References Cited

U.S. PATENT DOCUMENTS 2,325,396 A * 7/1943 Hastings, Jr. ......... B62B 3/0612
   280/43.12
2,592,091 A * 4/1952 Weaver ................. B62B 3/0612
   104/247
2,993,703 A * 7/1961 Paradise ............... B62B 3/0612
   280/43.12
(Continued)

FOREIGN PATENT DOCUMENTS

CN    101434251 B    4/2011
CN    104943725 A    9/2015
(Continued)

OTHER PUBLICATIONS

Reasons for refusal dated Jun. 13, 2023, in corresponding Japanese Application 2020-002867.
(Continued)

*Primary Examiner* — Kevin Hurley
*Assistant Examiner* — Michael R Stabley
(74) *Attorney, Agent, or Firm* — United IP Counselors, LLC

(57) ABSTRACT

A drive unit includes a support frame, a drive wheel and a prime mover. The support frame is disposed to be pivotable about a pivot axis. The drive wheel is supported by the support frame. The prime mover is supported by the support frame. The prime mover drives the drive wheel. The support frame and at least one member form a pivot unit. The at least one member pivots together with the support frame. The pivot unit has a center of gravity disposed on the opposite side of the pivot axis with respect to the drive wheel.

7 Claims, 8 Drawing Sheets

(56) References Cited

U.S. PATENT DOCUMENTS

| | | | | |
|---|---|---|---|---|
| 3,188,107 A * | 6/1965 | Quayle | ............... | B62B 3/0618 280/43.23 |
| 3,211,248 A * | 10/1965 | Quayle | ............... | B60K 1/00 180/211 |
| 3,246,713 A * | 4/1966 | Nichols | ............... | B62B 3/0612 280/43.12 |
| 3,249,170 A * | 5/1966 | Quayle | ............... | B62D 51/005 280/43.12 |
| 3,507,351 A * | 4/1970 | Goodacre | ............... | B62B 3/0612 182/15 |
| 3,622,123 A * | 11/1971 | Le Gloan | ............... | B62B 3/0625 254/2 R |
| 3,625,534 A * | 12/1971 | Harrison | ............... | B62B 3/0618 280/43.12 |
| 3,963,257 A * | 6/1976 | Harron | ............... | B60P 1/027 280/43.12 |
| 4,287,959 A * | 9/1981 | Inman | ............... | B60K 1/02 338/153 |
| 4,813,703 A * | 3/1989 | Fischer | ............... | B62B 3/0612 280/43.12 |
| 4,938,493 A * | 7/1990 | Okuda | ............... | B62B 3/0618 137/557 |
| 4,969,794 A * | 11/1990 | Larsen | ............... | B62B 3/0618 280/43.12 |
| 5,113,960 A * | 5/1992 | Prinz | ............... | B62B 3/0612 280/43.12 |
| 5,403,024 A * | 4/1995 | Frketic | ............... | B62B 3/008 280/43.12 |
| 5,516,128 A * | 5/1996 | Nakade | ............... | B62B 3/0606 280/43.12 |
| 5,918,703 A * | 7/1999 | Nordstrom | ............... | B62B 3/0612 187/222 |
| 6,808,357 B2 * | 10/2004 | Lee | ............... | B62B 3/06 414/495 |
| 7,040,427 B2 * | 5/2006 | Toomey | ............... | B62B 3/0612 180/332 |
| 7,128,188 B2 * | 10/2006 | Seidlhuber | ............... | B62B 3/0618 187/229 |
| 7,641,011 B2 * | 1/2010 | Fridlington, Jr. | ............... | B62B 3/0618 180/68.5 |
| 7,731,206 B2 * | 6/2010 | Borrmann | ............... | B62B 3/0625 280/47.34 |
| 8,752,657 B2 * | 6/2014 | Newell | ............... | B62B 5/0033 280/43.12 |
| 9,517,784 B2 | 12/2016 | Sekine et al. | | |
| 9,623,891 B2 * | 4/2017 | Newell | ............... | B62B 3/0612 |
| 9,963,330 B2 * | 5/2018 | Huether | ............... | B62B 3/0606 |
| 11,318,974 B2 * | 5/2022 | Jiang | ............... | B62B 5/0053 |
| 11,401,145 B2 * | 8/2022 | White | ............... | B66F 9/00 |
| 11,427,241 B2 * | 8/2022 | Katsura | ............... | B62B 5/005 |
| 11,548,337 B2 | 1/2023 | Tamura et al. | | |
| 11,643,123 B2 * | 5/2023 | Yifrah | ............... | B62B 5/0046 180/19.2 |

FOREIGN PATENT DOCUMENTS

| | | | | |
|---|---|---|---|---|
| CN | 105073550 A | | 11/2015 | |
| CN | 108791382 A | * | 11/2018 | ............... B62B 1/14 |
| CN | 108136891 B | | 1/2023 | |
| JP | 2008126900 A | | 6/2008 | |
| JP | 2014-512307 A | | 5/2014 | |

OTHER PUBLICATIONS

Office Action issued for the corresponding Chinese application dated Oct. 11, 2023.

* cited by examiner

DRIVE UNIT

CROSS-REFERENCE TO RELATED APPLICATIONS

This application claims priority to Japanese Patent Application No. 2020-002867, filed Jan. 10, 2020. The entire contents of that application are incorporated by reference herein in their entirety.

TECHNICAL FIELD

The present invention relates to a drive unit configured to be attached to a carrier, especially a hand pallet jack or truck.

BACKGROUND ART

It has been proposed to attach a drive unit to such a carrier as a hand pallet jack or truck or an AGV (Automated Guided Vehicle). For example, Japanese translation of PCT International Application Publication No. 2014-512307 proposes attaching a drive unit to a manually powered hand pallet jack or truck to enhance the performance of the hand pallet jack or truck. The drive unit includes a drive wheel, a motor, a battery and so forth. The drive wheel is supported by a drive wheel arm.

A hand pallet jack or truck provided with the drive unit described above includes a spring for urging the drive wheel arm downward. The spring prevents occurrence of a situation that the drive wheel idles while floating above a floor surface.

BRIEF SUMMARY

It is an object of the present invention to prevent idling of a drive wheel by means different from a spring.

A drive unit according to an aspect of the present invention is configured to be attached to a carrier. The drive unit includes a support frame, a drive wheel and a prime mover. The support frame is disposed to be pivotable about a pivot axis. The drive wheel is supported by the support frame. The prime mover is supported by the support frame. The prime mover drives the drive wheel. The support frame and at least one member except for the drive wheel form a pivot unit. The at least one member pivots together with the support frame. The pivot unit have a center of gravity disposed on an opposite side of the pivot axis with respect to the drive wheel.

According to the configuration, the center of gravity of the pivot unit is disposed on the opposite side of the pivot axis with respect to the drive wheel. Because of this, the pivot axis functions as a point of fulcrum, the center of gravity of the pivot unit functions as a point of effort, and a point, at which the drive wheel and a floor surface makes contact with each other, functions as a point of load, whereby the drive wheel can be urged downward by the law of lever. Therefore, the drive wheel can be pressed onto the floor surface without using any spring, and consequently, idling of the drive wheel can be prevented. It should be noted that a spring may be further used for preventing idling of the drive wheel. When the spring is thus used, idling of the drive wheel can be more reliably prevented by both the urging force of the spring and the weight of the pivot unit.

Preferably, the prime mover is disposed on the opposite side of the pivot axis with respect to the drive wheel.

Preferably, the drive unit further includes a battery and an inverter. The battery and the inverter are each supported by the support frame. The battery and the inverter are each disposed on the opposite side of the pivot axis with respect to the drive wheel. For example, the battery and the inverter are each enabled to have a center of gravity disposed behind a center of gravity of the prime mover.

Preferably, the drive unit further includes a power transmission mechanism. The power transmission mechanism transmits power from the prime mover to the drive wheel. The power transmission mechanism is supported by the support frame. The power transmission mechanism is disposed on the opposite side of the pivot axis with respect to the drive wheel.

Preferably, the drive unit further includes a weight. The weight is supported by the support frame. The weight is disposed on the opposite side of the pivot axis with respect to the drive wheel. Preferably, the weight has a center of gravity disposed behind the center of gravity of the prime mover.

Overall, according to the present invention, idling of a drive wheel can be prevented by means different from a spring.

DETAILED DESCRIPTION

Figure 1:
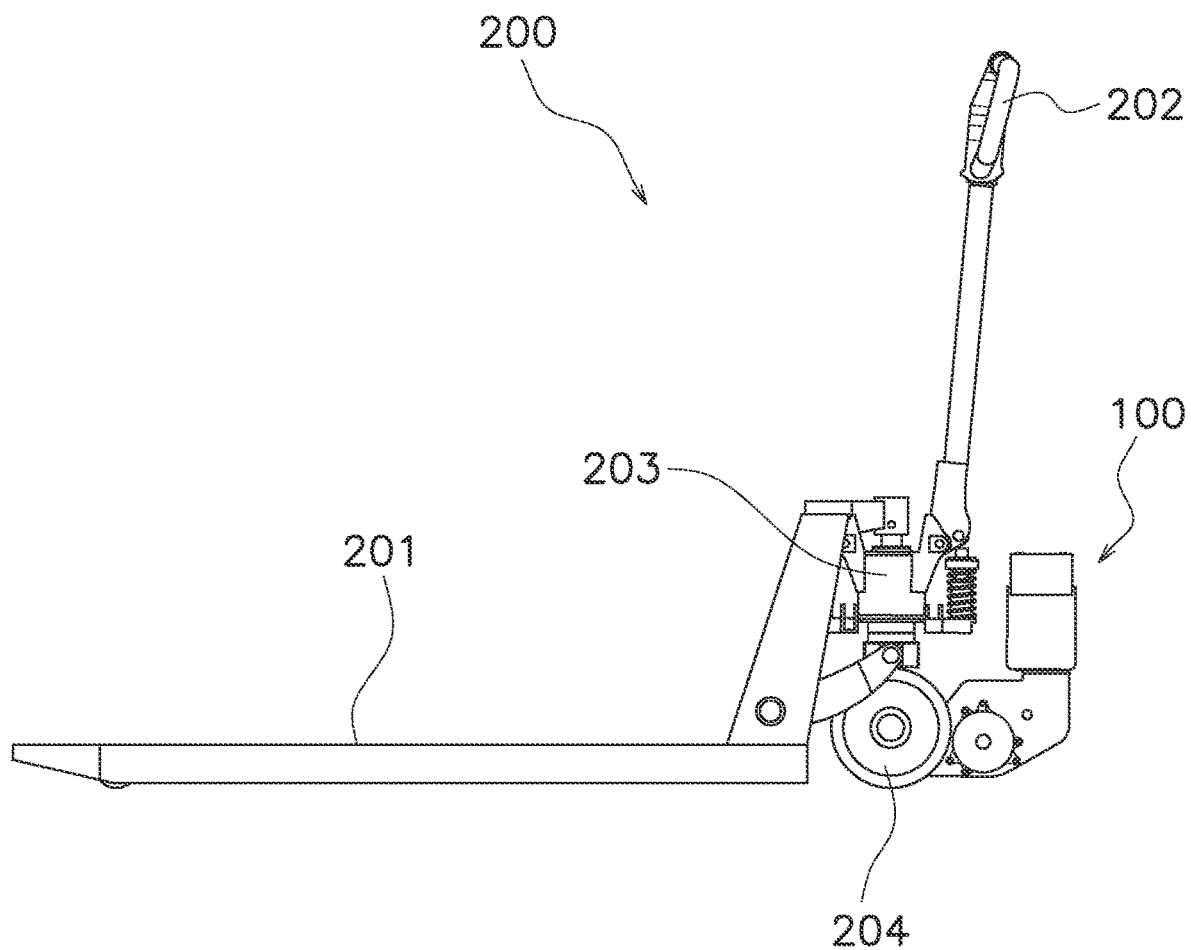
FIG. 1 is a side view of a hand pallet jack or truck to which a drive unit is attached.
Figure 2:
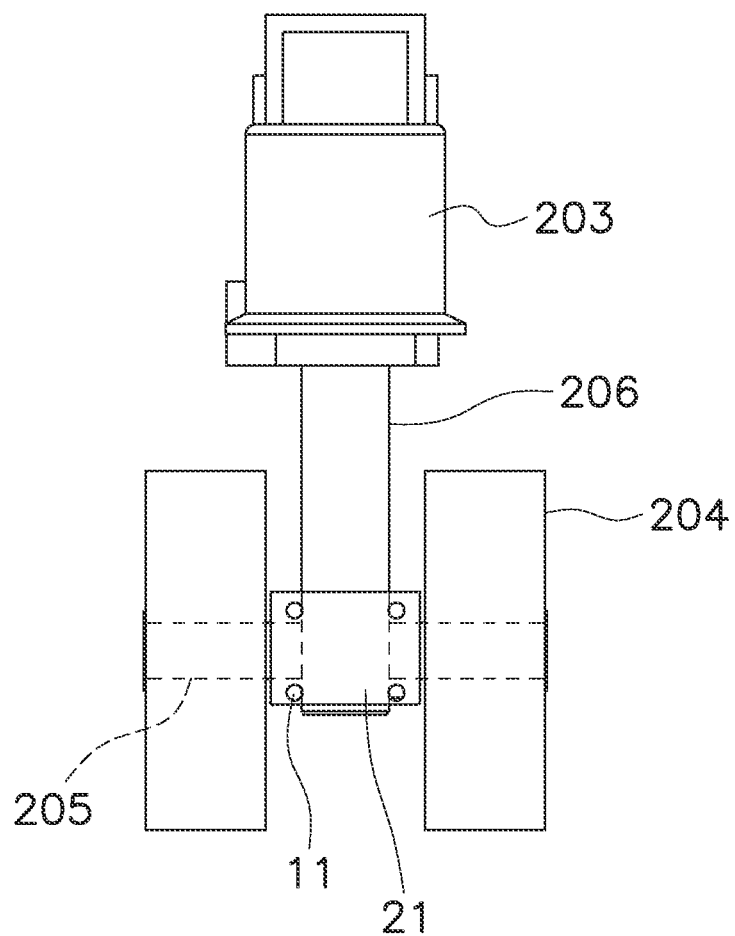
FIG. 2 is a rear view of a structure of a steering axle member and the surroundings thereof.

A preferred embodiment of a drive unit according to the present invention will be hereinafter explained with reference to drawings. It should be noted that in the following explanation, the term "front" refers to a moving direction of a hand pallet jack or truck pushed by an operator, whereas the term "rear" refers to a moving direction of the hand pallet jack or truck pulled by the operator. FIG. 1 is a side view of a hand pallet jack or truck 200 to which a drive unit 100 is attached. FIG. 2 is a rear view of a structure of a steering axle member and the surroundings thereof. It should be noted that FIG. 2 omits illustration of some members.

<Hand Pallet Jack or Truck>

As shown in FIGS. 1 and 2, the hand pallet jack or truck 200 (exemplary carrier) includes a pair of fork arms 201, a handle 202, a hydraulic cylinder 203, a pair of steered wheels 204, a steering axle member 205 and a support shaft member 206. The drive unit 100 is attached to the hand pallet jack or truck 200.

As shown in FIG. 2, the pair of steered wheels 204 is rotatably attached to the steering axle member 205 extending in a horizontal direction. The steering axle member 205 is supported by the support shaft member 206. The support shaft member 206 extends downward from the hydraulic cylinder 203. The steering axle member 205 extends from the support shaft member 206 to the both sides in the horizontal direction. Each of the steering axle member 205 and the support shaft member 206 has a columnar shape.

<Drive Unit>

Figure 3:
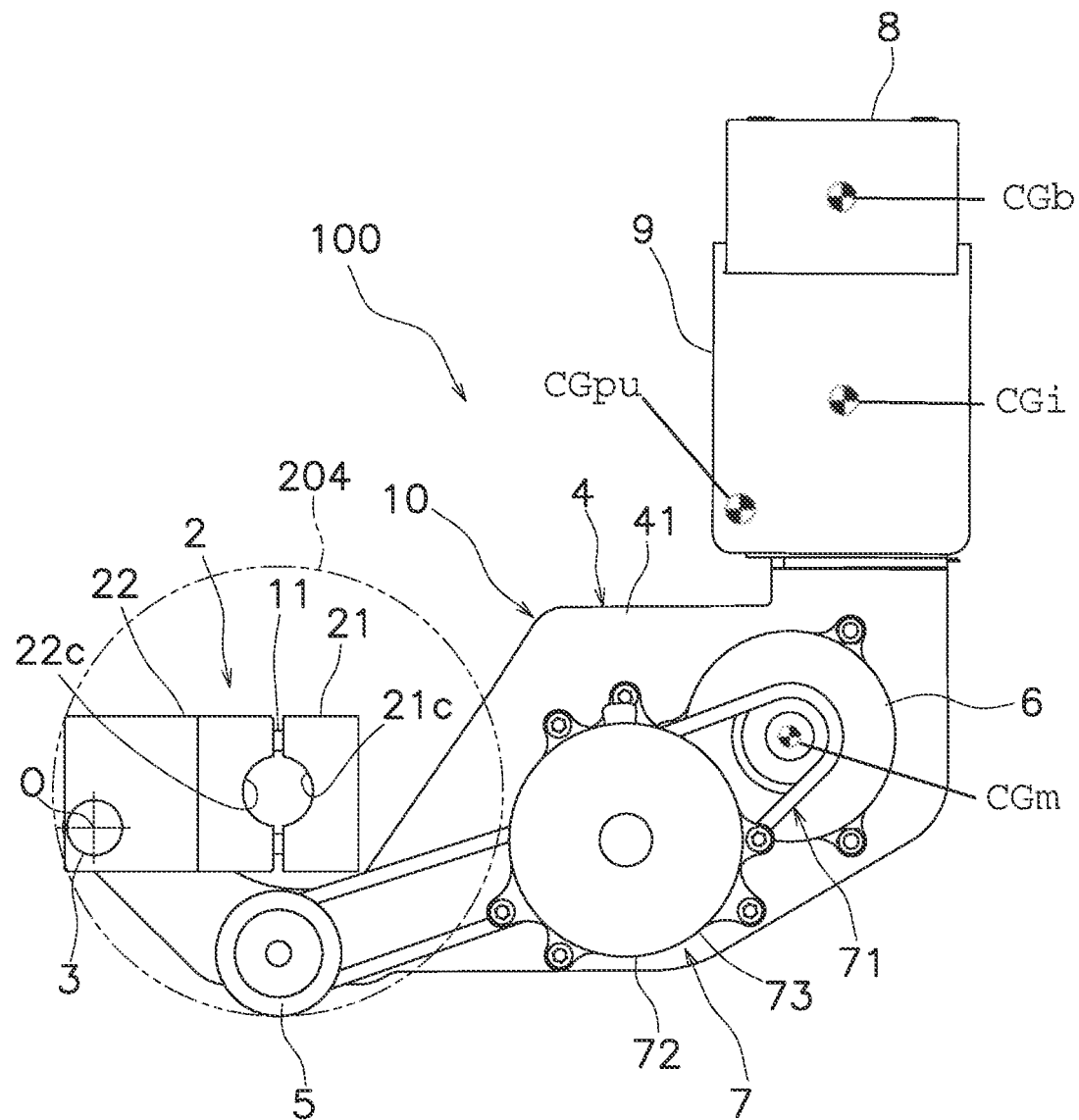
FIG. 3 is a side view of the drive unit.

FIG. 3 is a side view of the drive unit 100. It should be noted that FIG. 3 omits illustration of near-side one of support plates 41 of the drive unit 100.

As shown in FIG. 3, the drive unit 100 includes a coupling mechanism 2, a pivot pin 3, a support frame 4, a drive wheel 5, a motor 6 (exemplary prime mover), a power transmission mechanism 7, a battery 8 and an inverter 9.

<Coupling Mechanism>

The coupling mechanism 2 is a mechanism for coupling the drive unit 100 to the hand pallet jack or truck 200. The coupling mechanism 2 includes a first coupling member 21 and a second coupling member 22.

Figure 4:
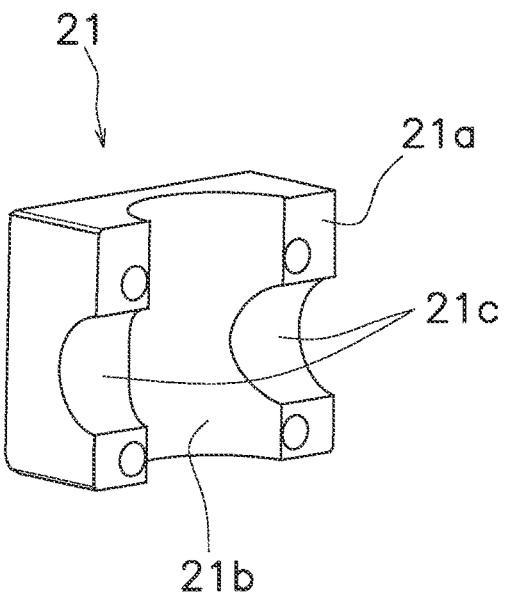
FIG. 4 is a perspective view of a first coupling member as seen from a front side.
Figure 5:
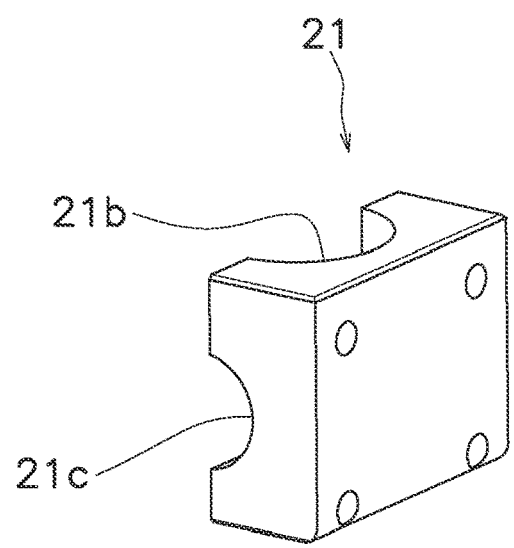
FIG. 5 is a perspective view of the first coupling member as seen from a rear side.

FIG. 4 is a perspective view of the first coupling member 21 as seen from a front side. FIG. 5 is a perspective view of the first coupling member 21 as seen from a rear side. As shown in FIGS. 4 and 5, the first coupling member 21 includes a first opposed surface 21a.

The first coupling member 21 includes a first vertical groove 21b and a first transverse groove 21c on the first opposed surface 21a. The first vertical groove 21b extends in an up-and-down direction. As seen in a plan view, the first vertical groove 21b has a semicircular shape. The inner wall surface of the first vertical groove 21b is shaped along the support shaft member 206.

The first transverse groove 21c extends in the horizontal direction. The first transverse groove 21c extends to intersect the first vertical groove 21b. The first vertical groove 21b is deeper than the first transverse groove 21c. Hence, the first transverse groove 21c is divided into two parts by the first vertical groove 21b. As seen in a side view, the first transverse groove 21c has a semicircular shape. The inner wall surface of the first transverse groove 21c is shaped along the steering axle member 205.

Figure 6:
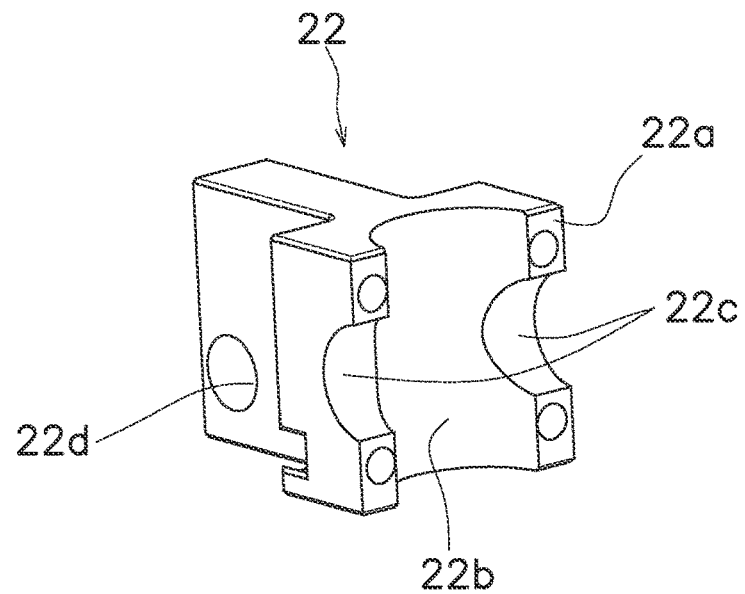
FIG. 6 is a perspective view of a second coupling member as seen from the rear side.
Figure 7:
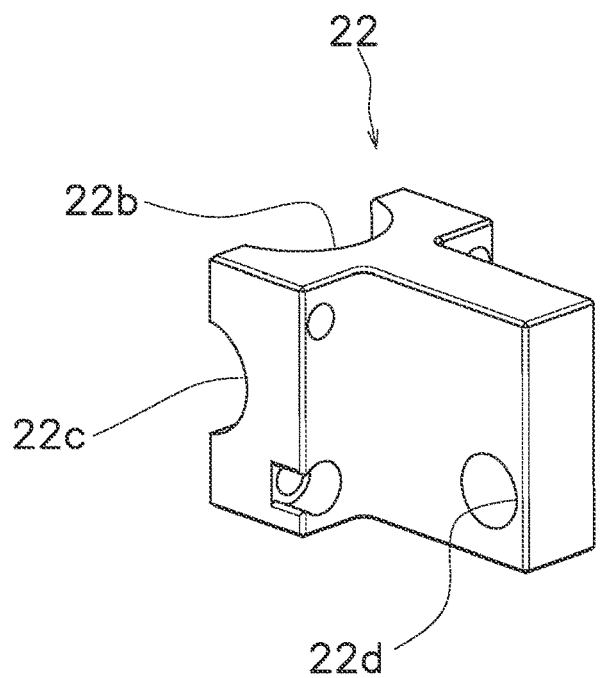
FIG. 7 is a perspective view of the second coupling member as seen from the front side.

FIG. 6 is a perspective view of the second coupling member 22 as seen from the rear side. FIG. 7 is a perspective view of the second coupling member 22 as seen from the front side. As shown in FIGS. 6 and 7, the second coupling member 22 includes a second opposed surface 22a. The second opposed surface 22a is opposed to the first opposed surface 21a.

The second coupling member 22 includes a second vertical groove 22b and a second transverse groove 22c on the second opposed surface 22a. The second vertical groove 22b is shaped substantially identical to the first vertical groove 21b. In other words, the second vertical groove 22b extends in the up-and-down direction. As seen in a plan view, the second vertical groove 22b has a semicircular shape. The inner wall surface of the second vertical groove 22b is shaped along the support shaft member 206. While the drive unit 100 is not being attached to the hand pallet jack or truck 200, the second vertical groove 22b is opposed to the first vertical groove 21b.

The first and second vertical grooves 21b and 22b define a columnar through hole. The first and second vertical grooves 21b and 22b accommodate therein the support shaft member 206. The first and second vertical grooves 21b and 22b are configured to press, at the inner wall surfaces thereof, the outer peripheral surface of the support shaft member 206. It should be noted that the first and second vertical grooves 21b and 22b each have a diameter equal to or slightly greater than that of the support shaft member 206. Besides, each vertical groove 21b, 22b has a cross section made in the shape of a circular arc slightly shorter than a semicircle.

The second transverse groove 22c is shaped substantially identical to the first transverse groove 21c. In other words, the second transverse groove 22c extends in the horizontal direction. The second transverse groove 22c extends to intersect the second vertical groove 22b. The second vertical groove 22b is deeper than the second transverse groove 22c. Hence, the second transverse groove 22c is divided into two parts by the second vertical groove 22b. As seen in a side view, the second transverse groove 22c has a semicircular shape. The inner wall surface of the second transverse groove 22c is shaped along the steering axle member 205.

While the drive unit 100 is not being attached to the hand pallet jack or truck 200, the second transverse groove 22c is opposed to the first transverse groove 21c. The first and second transverse grooves 21c and 22c define a columnar through hole. The first and second transverse grooves 21c and 22c accommodate therein the steering axle member 205. The first and second transverse grooves 21c and 22c are configured to press, at the inner wall surfaces thereof, the outer peripheral surface of the steering axle member 205. It should be noted that the first and second transverse grooves 21c and 22c each have a diameter equal to or slightly greater than that of the steering axle member 205. Besides, each transverse groove 21c, 22c has a cross section made in the shape of a circular arc slightly shorter than a semicircle.

As shown in FIGS. 2 and 3, the first and second coupling members 21 and 22 are attached to each other in a detachable manner. The first and second coupling members 21 and 22 are fastened by a plurality of fastening members 11. It should be noted that in the present preferred embodiment, bolts are provided as the fastening members 11 to fasten the first and second coupling members 21 and 22 to each other. The bolts are screwed into threaded holes provided in the first coupling member 21 or the second coupling member 22. The plural fastening members 11 are disposed to interpose the first and second transverse grooves 21c and 22c in the up-and-down direction. Besides, the plural fastening members 11 are disposed to interpose the first and second vertical grooves 21b and 22b in the horizontal direction. It should be noted that plural pairs of bolt and nut may be provided as the fastening members 11 to fasten the first and second coupling members 21 and 22 to each other. In this case, the first and second coupling members 21 and 22 may not be provided with the threaded holes.

In attaching the drive unit 100 to the hand pallet jack or truck 200, first, the fastening members 11 are removed and the second coupling member 22 is detached from the first coupling member 21. Then, while the first vertical groove 21b of the first coupling member 21 is aligned with the support shaft member 206, the first transverse groove 21c of the first coupling member 21 is aligned with the steering axle member 205. On the other hand, while the second vertical groove 22b of the second coupling member 22 is aligned with the support shaft member 206, the second transverse groove 22c of the second coupling member 22 is aligned with the steering axle member 205. Then, the second coupling member 22 is attached to the first coupling member 21 by the fastening members 11. Consequently, the drive unit 100 is attached to the hand pallet jack or truck 200.

The first and second coupling members 21 and 22 are fastened to each other while interposing therebetween the steering axle member 205 and the support shaft member 206, whereby the coupling mechanism 2 is attached to the steering axle member 205 and the support shaft member 206. In this condition, the steering axle member 205 is disposed within the first and second transverse grooves 21c and 22c, whereas the support shaft member 206 is disposed within the first and second vertical grooves 21b and 22b. Because of this, the coupling mechanism 2 is made non-rotatable relative to the steering axle member 205 and the support shaft member 206.

Preferably, the first and second transverse grooves 21c and 22c press, at the inner wall surfaces thereof, the steering axle member 205 from the both sides in a back-and-forth direction (a right-and-left direction in FIG. 3). In other words, the first and second coupling members 21 and 22 interpose therebetween the steering axle member 205. On the other hand, preferably, the first and second vertical grooves 21b and 22b press, at the inner wall surfaces thereof, the support shaft member 206 from the both sides in the back-and-forth direction. In other words, the first and second coupling members 21 and 22 interpose therebetween the support shaft member 206.

The second coupling member 22 includes a through hole 22d. The through hole 22d extends in the extending direction of the steering axle member 205. The second coupling member 22 is disposed ahead of the first coupling member 21.

<Pivot Pin>

As shown in FIG. 3, the coupling mechanism 2 and the support frame 4 are coupled to each other in a pivotable manner by the pivot pin 3. In the present preferred embodiment, the pivot pin 3 extends inside the through hole 22d of the coupling mechanism 2 and a pair of through holes (not shown in the drawings) of the support frame 4. The pivot pin 3 extends in the horizontal direction. The pivot pin 3 extends in approximately parallel to the steering axle member 205.

The pivot pin 3 has a columnar shape. The center axis of the pivot pin 3 corresponds to a pivot axis O. The pivot axis O is disposed below the center axis of the steering axle member 205. The pivot pin 3 is disposed ahead (on the left side in FIG. 3) of the steering axle member 205. The pivot pin 3 may be fixed to the coupling mechanism 2, or alternatively, may be part of the coupling mechanism 2. Besides, the pivot pin 3 may fixed to the support frame 4, or alternatively, may be part of the support frame 4.

<Support Frame>

The support frame 4 is disposed to be pivotable about the pivot axis O. The support frame 4, when described in detail, is attached to the coupling mechanism 2 through the pivot pin 3. The support frame 4 is attached to the coupling mechanism 2 while being pivotable about the pivot axis O. The support frame 4 extends rearward (rightward in FIG. 3) from the pivot axis O. The support frame 4 supports the drive wheel 5, the motor 6, the power transmission mechanism 7, the battery 8 and the inverter 9.

The support frame 4 includes a pair of support plates 41. The pair of support plates 41 is disposed at an interval in the width direction of the hand pallet jack or truck 200. It should be noted that FIG. 3 omits illustration of near-side one of the pair of support plates 41. The pair of support plates 41 is disposed to interpose therebetween the drive wheel 5.

<Drive Wheel>

The drive wheel 5 is rotatably supported by the support frame 4. The lower end of the drive wheel 5 is disposed below that of the support frame 4. In other words, the drive wheel 5 makes contact with a floor surface. The support frame 4 preferably does not make contact with the floor surface. The drive wheel 5 rolls on the floor surface. It should be noted that in the present preferred embodiment, the drive unit 100 includes the single drive wheel 5, but alternatively, may include a plurality of drive wheels 5. The rotational axis of the drive wheel 5 is disposed in a back-and-forth directional position approximately identical to that of the pair of steered wheels 204.

<Motor>

The motor 6 is configured to drive the drive wheel 5. The motor 6 is an electric motor. The motor 6 is supported by the support frame 4. The motor 6 is disposed on the opposite side of the pivot axis O with respect to the drive wheel 5. In other words, the pivot axis O is disposed ahead of the drive wheel 5, whereas the motor 6 is disposed behind the drive wheel 5. Because of this, the distance from the pivot axis O to the motor 6 is longer than that from the pivot axis O to the drive wheel 5.

The rotational axis of the motor 6 extends in the horizontal direction. The rotational axis of the motor 6 extends in approximately parallel to the pivot axis O. Besides, the rotational axis of the motor 6 extends in approximately parallel to the center axis of the steering axle member 205. The rotational axis of the motor 6 is disposed above the pivot axis O. Besides, the rotational axis of the motor 6 is disposed above the center axis of the steering axle member 205.

<Power Transmission Mechanism>

The power transmission mechanism 7 is configured to transmit power from the motor 6 to the drive wheel 5. The power transmission mechanism 7 includes, for instance, a reduction mechanism 71, a clutch mechanism 72 and a torque limiter mechanism 73. The power transmission mechanism 7 is supported by the support frame 4. The power transmission mechanism 7 is disposed on the opposite side of the pivot axis O with respect to the drive wheel 5. In other words, the power transmission mechanism 7 is disposed behind the drive wheel 5. Because of this, the distance from the pivot axis O to the power transmission mechanism 7 is longer than that from the pivot axis O to the drive wheel 5.

The reduction mechanism 71 is configured to reduce the speed of rotation of the motor 6 and transmit the speed-reduced rotation to the drive wheel 5. The reduction mechanism 71 includes, for instance, a plurality of pulleys and a belt. The pulleys are mounted to, for instance, the drive wheel 5, the motor 6, the clutch mechanism 72, the torque limiter mechanism 73 and so forth, respectively. It should be noted that the reduction mechanism 71 may include a plurality of sprockets and a chain instead of the plurality of pulleys and the belt. Alternatively, the reduction mechanism 71 may include a plurality of gears instead of the plurality of pulleys and the belt. Yet alternatively, the reduction mechanism 71 may be configured to transmit power magnetically. Specifically, the reduction mechanism 71 may include a plurality of magnetic gears instead of the plurality of pulleys and the belt.

The clutch mechanism 72 is configured to transmit the power from the motor 6 to the drive wheel 5 and block transmission of the power.

When a torque transmitted from the motor 6 to the drive wheel 5 exceeds a predetermined threshold, the torque limiter mechanism 73 is configured to block transmission of the torque from the motor 6 to the drive wheel 5. Alternatively, when a torque inputted to the motor 6 from the drive wheel 5 exceeds a predetermined threshold, the torque limiter mechanism 73 is configured to block transmission of the torque from the drive wheel 5 to the motor 6.

<Battery>

The battery 8 is configured to supply electric power to electric components such as the motor 6. The battery 8 is rechargeable. The battery 8 is disposed above the pivot axis O, the drive wheel 5 and the motor 6.

The battery 8 is supported by the support frame 4. The battery 8 is disposed on the opposite side of the pivot axis O with respect to the drive wheel 5. In other words, the battery 8 is disposed behind the drive wheel 5. Because of this, the distance from the pivot axis O to the battery 8 is longer than that from the pivot axis O to the drive wheel 5. The center of gravity CGb of the battery 8 is disposed behind the center of gravity CGm of the motor 6.

<Inverter>

The inverter 9 is connected to the battery 8 and the motor 6 while being disposed therebetween. The inverter 9 is configured to control the voltage, frequency and phase of the electric power supplied from the battery 8 to the motor 6. The inverter 9 is configured to regulate the rotational speed and the output torque of the motor 6. The inverter 9 is disposed above the pivot axis O, the drive wheel 5 and the motor 6.

The inverter 9 is supported by the support frame 4. The inverter 9 is disposed on the opposite side of the pivot axis O with respect to the drive wheel 5. In other words, the inverter 9 is disposed behind the drive wheel 5. Because of this, the distance from the pivot axis O to the inverter 9 is longer than that from the pivot axis O to the drive wheel 5. The center of gravity CGi of the inverter 9 is disposed behind the center of gravity CGm of the motor 6.

<Pivot Unit>

A pivot unit 10 is a unit composed of the support frame 4 and members (except for the drive wheel 5) pivoting together with the support frame 4. The drive wheel 5 is not a component member of the pivot unit 10. It should be noted that the members pivoting together with the support frame 4 refer to members supported by the support frame 4. It should be noted that in the present preferred embodiment, the pivot unit 10 is composed of the support frame 4, the motor 6, the power transmission mechanism 7, the battery 8 and the inverter 9.

The center of gravity CGpu of the pivot unit 10 is disposed on the opposite side of the pivot axis O with respect to the drive wheel 5. In other words, the center of gravity CGpu of the pivot unit 10 is disposed behind the drive wheel 5. Because of this, the distance from the pivot axis O to the center of gravity CGpu of the pivot unit 10 is longer than that from the pivot axis O to the drive wheel 5. By thus disposing the center of gravity CGpu of the pivot unit 10, the drive wheel 5 is enabled to be pressed onto the floor surface. In other words, such a situation can be inhibited that the drive wheel 5 idles while floating above the floor surface. It should be noted that the pivot axis O functions as a point of fulcrum, the center of gravity CGpu of the pivot unit 10 functions as a point of effort, and the contact point, at which the drive wheel 5 and the floor surface make contact with each other, functions as a point of load.

The center of gravity CGpu of the pivot unit 10 may be disposed, for instance, above or below the pivot axis O. Alternatively, the center of gravity CGpu of the pivot unit 10 may be disposed in an up-and-down directional position approximately identical to that of the pivot axis O. In other words, the center of gravity CGpu of the pivot unit 10 may be disposed at a height approximately identical to that of the pivot axis O.

[Modifications]

One preferred embodiment of the present invention has been explained above. However, the present invention is not limited to the above, and a variety of changes can be made without departing from the gist of the present invention.

Modification 1

In the preferred embodiment described above, the drive unit 100 includes the motor 6 as the prime mover. However, the configuration of the drive unit 100 is not limited to this. For example, the drive unit 100 may include another type of prime mover such as an internal combustion engine.

Modification 2

Figure 8:
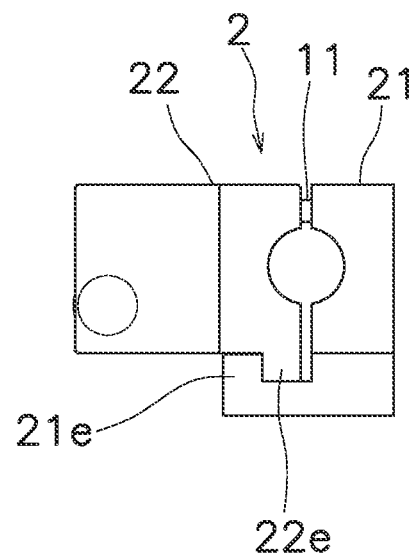
FIG. 8 is a side view of a coupling mechanism according to a modification.

As shown in FIG. 8, the first coupling member 21 may include a first interlocking portion 21e. Besides, the second coupling member 22 may include a second interlocking portion 22e. The first and second interlocking portions 21e and 22e interlock with each other. Thus, with interlocking between the first and second interlocking portions 21e and 22e, the first and second coupling members 21 and 22 can be restricted from moving away from each other in opposite directions. Because of this, the fastening members 11 can be more reduced in number than the preferred embodiment described above.

Modification 3

Figure 9:
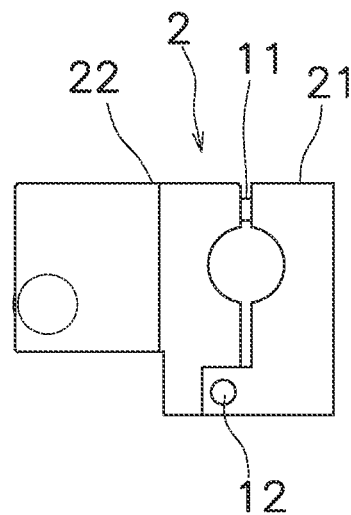
FIG. 9 is a side view of a coupling mechanism according to another modification.

As shown in FIG. 9, the first and second coupling members 21 and 22 may be coupled to each other by a hinge mechanism 12. According to this configuration, the first and second coupling members 21 and 22 are made pivotable about the hinge mechanism 12. Because of this, the fastening members 11 can be more reduced in number than the preferred embodiment described above. Besides, attaching workability can be enhanced by the coupling mechanism 2.

Modification 4

Figure 10:
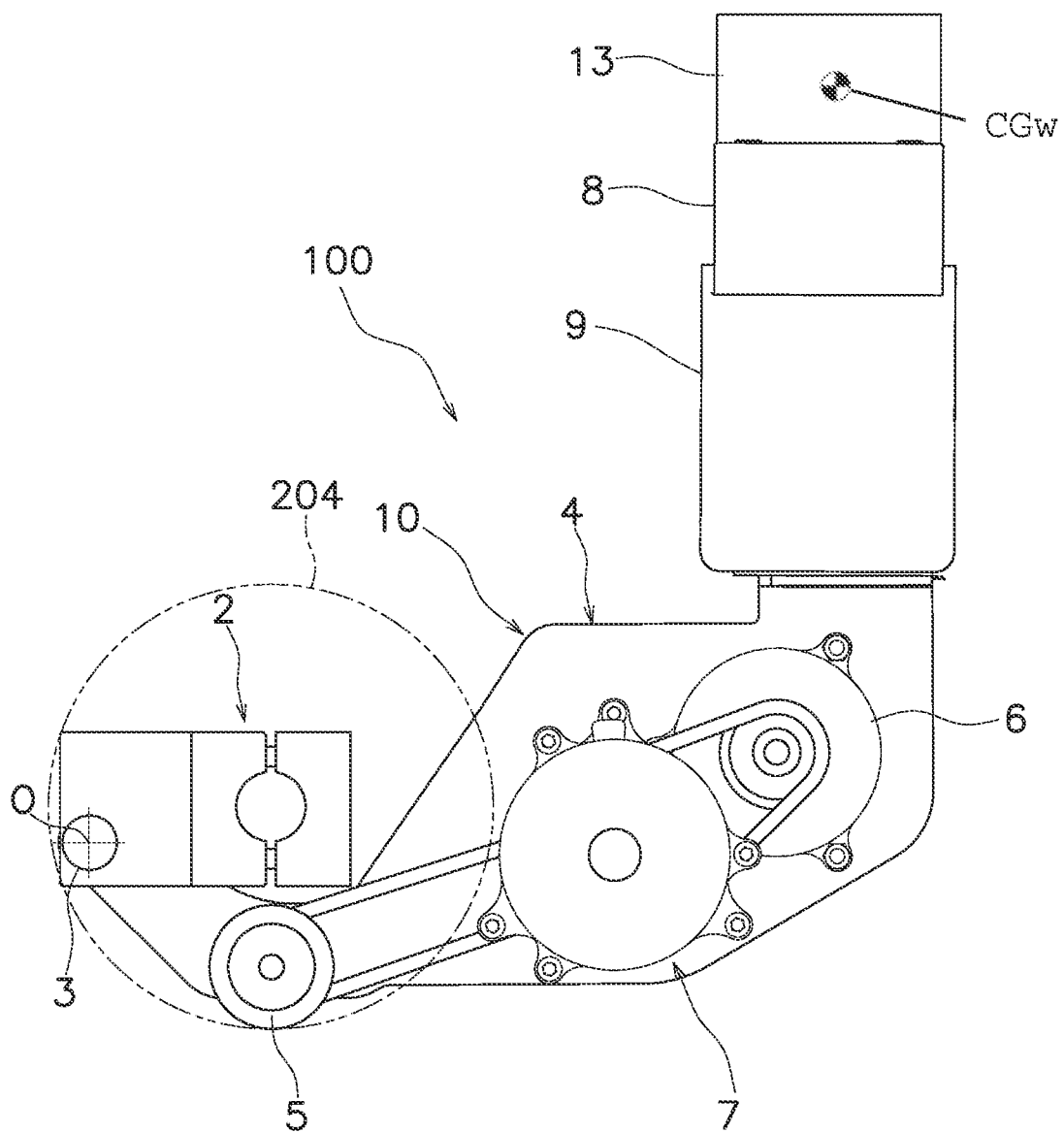
FIG. 10 is a side view of a drive unit according to yet another modification.

As shown in FIG. 10, the drive unit 100 may further include a weight 13. The weight 13 is supported by the support frame 4. The weight 13, when described in detail, is disposed on the battery 8. It should be noted that the layout of the weight 13 is not limited to this. The weight 13 is disposed above the pivot axis O, the drive wheel 5 and the motor 6.

The weight 13 is disposed on the opposite side of the pivot axis O with respect to the drive wheel 5. In other words, the weight 13 is disposed behind the drive wheel 5. Because of this, the distance from the pivot axis O to the weight 13 is longer than that from the pivot axis O to the drive wheel 5. The center of gravity CGw of the weight 13 is disposed behind the center of gravity CGm of the motor 6. It should be noted that the center of gravity CGw of the weight 13 may be disposed ahead of the center of gravity CGm of the motor 6.

Modification 5

In the preferred embodiment described above, the first and second coupling members 21 and 22 are different in shape from each other. However, the configuration of the coupling mechanism 2 is not limited to this. For example, the second coupling member 22 may be shaped identical to the first coupling member 21.

Modification 6

Figure 11:
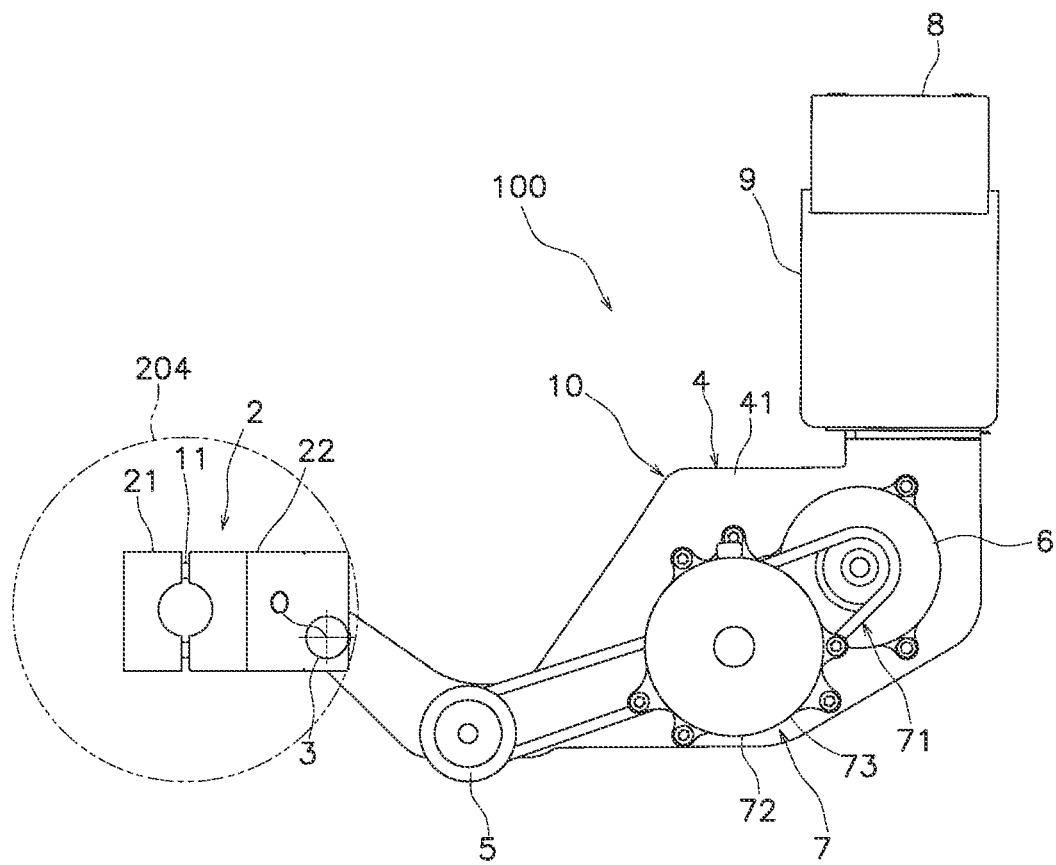
FIG. 11 is a side view of a drive unit according to further yet another modification.

In the preferred embodiment described above, the second coupling member 22 is disposed ahead of the first coupling member 21. However, the configuration of the coupling mechanism 2 is not limited to this. For example, as shown in FIG. 11, the second coupling member 22 may be disposed behind the first coupling member 21.

Modification 7

In the preferred embodiment described above, the center of gravity CGb of the battery 8 is disposed behind the center of gravity CGm of the motor 6. However, the layout of the battery 8 is not limited to this. For example, the center of gravity CGb of the battery 8 may be disposed ahead of the center of gravity CGm of the motor 6. Likewise, the center of gravity CGi of the inverter 9 may be disposed ahead of the center of gravity CGm of the motor 6 as well.

Modification 8

In the preferred embodiment described above, the drive unit 100 is attached to the hand pallet jack or truck 200. However, an object to which the drive unit 100 is attached is not limited to the hand pallet jack or truck 200. For example, the drive unit 100 is attachable as well to another type of carrier such as a cart or an AVG.

REFERENCE SIGNS LIST

2 Coupling mechanism
21 First coupling member
21*a* First opposed surface
21*b* First vertical groove
21*c* First transverse groove
22 Second coupling member
22*a* Second opposed surface
22*b* Second vertical groove
22*c* Second transverse groove
4 Support frame
5 Drive wheel
6 Motor
7 Power transmission mechanism
8 Battery
9 Inverter
100 Drive unit
200 Hand pallet jack or truck

What is claimed is:

1. A drive unit configured to be attached to a carrier that has a steering axle member and a support shaft member, the drive unit comprising:
   a support frame disposed to be pivotable about a pivot axis;
   a drive wheel supported by the support frame;
   a prime mover supported by the support frame, the prime mover configured to drive the drive wheel; and
   a coupling member by which the drive unit can be attached to the carrier, the coupling member being configured to detachably fit around both the steering axle member and the support shaft member of the carrier with the pivot axis being provided by the coupling member,
   wherein a pivot unit, comprised by the support frame and at least one member other than the drive wheel, pivots relative to the pivot axis, and wherein the drive wheel and a center of gravity of the pivot unit are disposed on the same side of the pivot axis with the center of gravity of the pivot unit being farther from the pivot axis than the drive wheel is.

2. The drive unit according to claim 1, wherein the prime mover and the drive wheel are disposed on the same side of the pivot axis with the prime mover being farther from the pivot axis than the drive wheel is.

3. The drive unit according to claim 1, further comprising a battery and an inverter each supported by the support frame, wherein the battery and the inverter are each disposed on the same side of the pivot axis as the drive wheel is, with the battery and the inverter each being farther from the pivot axis than the drive wheel is.

4. The drive unit according to claim 3, wherein the battery and the inverter each have a center of gravity disposed farther from the pivot axis than a center of gravity of the prime mover is.

5. The drive unit according to claim 1, further comprising a power transmission mechanism configured to transmit power from the prime mover to the drive wheel, the power transmission mechanism supported by the support frame,
   wherein the power transmission mechanism is disposed on the same side of the pivot axis as the drive wheel is, with the power transmission mechanism being farther from the pivot axis than the drive wheel is.

6. The drive unit according to claim 1, further comprising a weight supported by the support frame, wherein the weight is disposed on the same side of the pivot axis as the drive wheel is, with the weight being farther from the pivot axis than the drive wheel is.

7. The drive unit according to claim 6, wherein the weight has a center of gravity disposed farther from the pivot axis than a center of gravity of the prime mover is.

* * * * *